A. HAJOS.
CUSHION TIRE.
APPLICATION FILED AUG. 10, 1910.
1,021,983.
Patented Apr. 2, 1912.
2 SHEETS—SHEET 1.
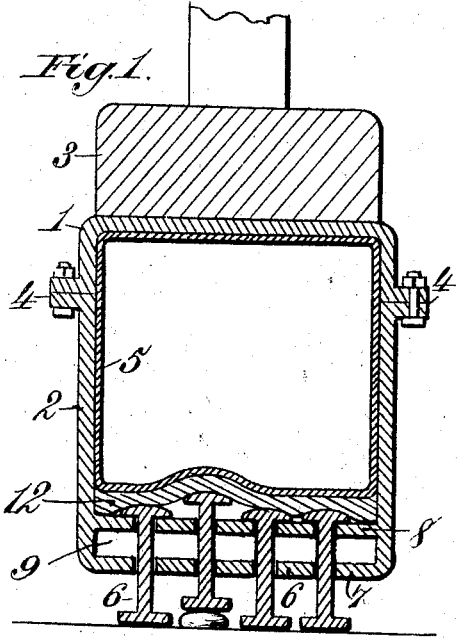
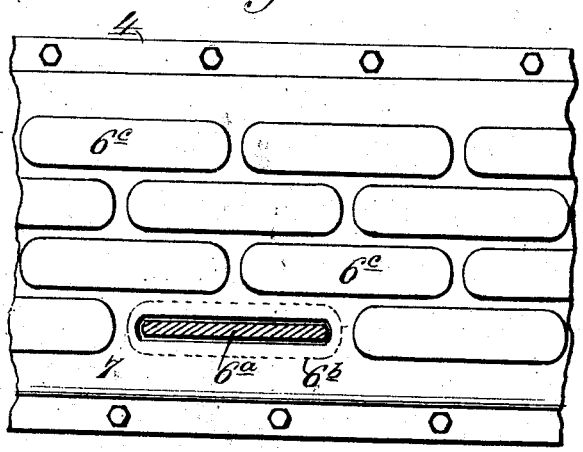
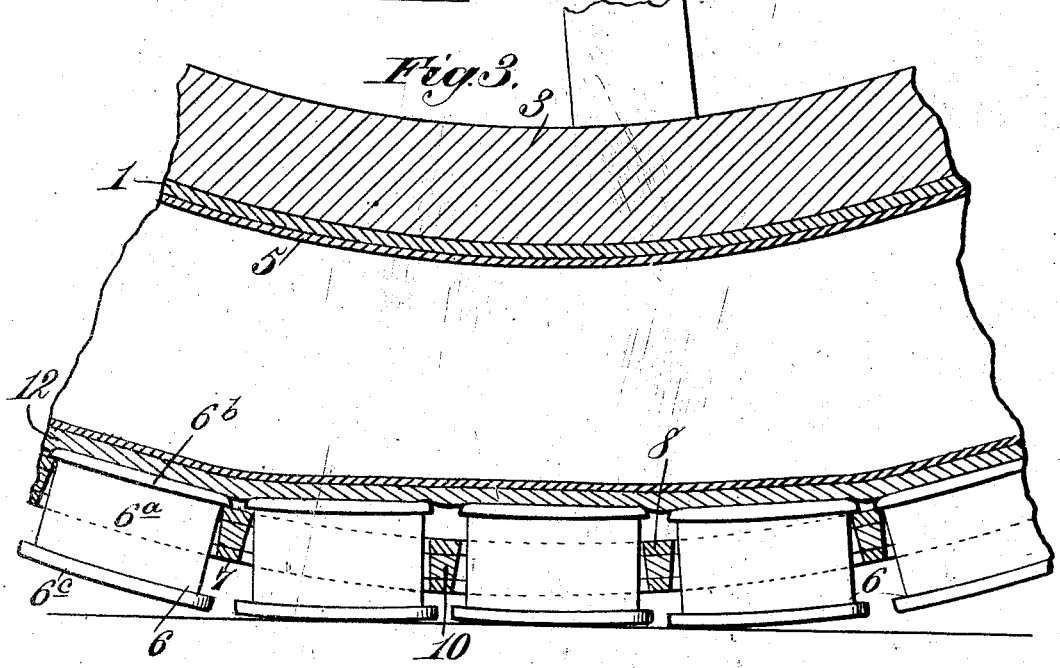
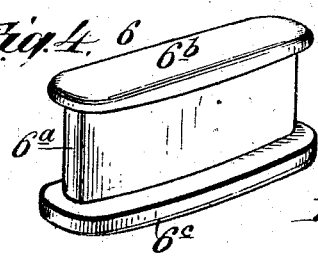
Witnesses.
Inventor.
Albin Hajos
By James L. Norris Jr.
Atty.

A. HAJOS.
CUSHION TIRE.
APPLICATION FILED AUG. 10, 1910.
1,021,983.
Patented Apr. 2, 1912.
2 SHEETS—SHEET 2.
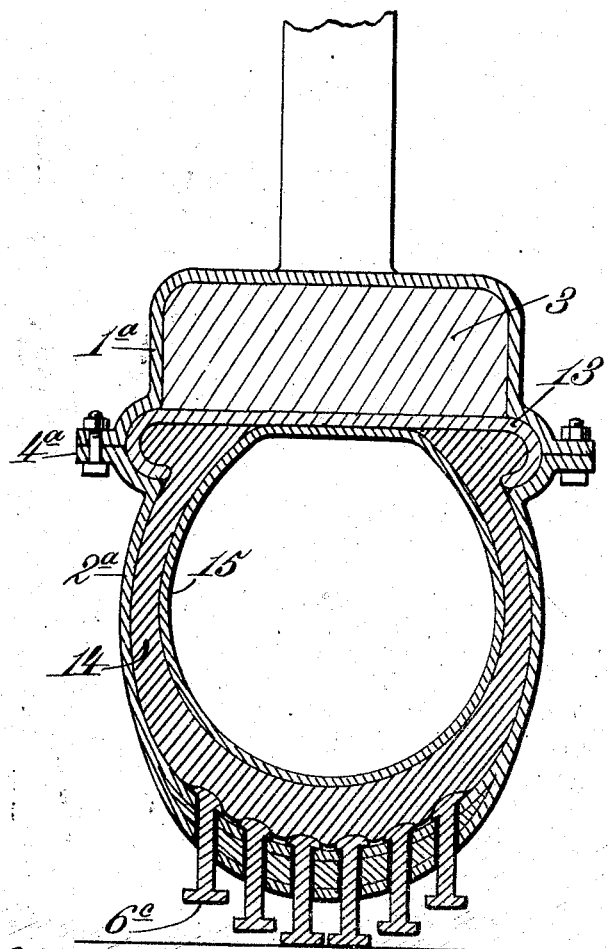
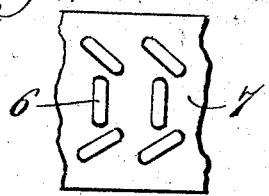
Witnesses
Inventor:
Albin Hajos,
By James L. Norris,
Atty.

UNITED STATES PATENT OFFICE.

ALBIN HAJOS, OF CHATTANOOGA, TENNESSEE.

CUSHION-TIRE.

1,021,983. Specification of Letters Patent. Patented Apr. 2, 1912.

Application filed August 10, 1910. Serial No. 576,436.

*To all whom it may concern:*

Be it known that I, ALBIN HAJOS, a citizen of the United States, residing at Chattanooga, in the county of Hamilton and State of Tennessee, have invented new and useful Improvements in Cushion-Tires, of which the following is a specification.

This invention relates to improvements in cushion tires.

The desirability of securing a tire which has the same resilient properties as an inflated rubber tire and yet which withal lacks the disadvantages of an inflated rubber tire, has long been recognized and various constructions of cushion tires have been proposed to meet the requirement. In most instances, however, such cushion tires have embodied an organization of mechanical adjuncts in substitution for the inflated rubber cushion ordinarily employed. Tires of this character have not, so far as I am aware, met with success for the reason that springs, regardless of their form or arrangement, do not possess the same degree of shock absorbing property as an inflated rubber tube, they are not as sensitive or responsive, they crystallize rapidly, and they cause undue wear of the parts with which they are associated.

The object of the present invention is to provide a cushion tire in which an inflated rubber tube is embodied as the cushioning element, in which there is absolutely no liability to puncturing or blow-outs and in which tread elements provided for coöperation with the rubber tube aforesaid afford an efficient anti-skidding means.

The parts which go to make up the organized construction are of such detail structure and are assembled in such manner that undue wear is avoided and the efficient life of the tire is considerably longer than that of an ordinary rubber tire or of many of the arrangements proposed as substitutes for the ordinary rubber tire.

Embodiments of the invention are illustrated by way of example in the accompanying drawings, wherein—

Figure 1 is a cross sectional view of a preferred form of the improved tire; Fig. 2 is a developed fragmentary plan view showing the tread face of the improved tire; Fig. 3 is a fragmentary longitudinal sectional view of the improved tire in the plane of a peripheral row of tread elements; Fig. 4 is a perspective view of a preferred form of tread element; Fig. 5 is a cross sectional view of a modified construction; Fig. 6 is a fragmentary developed plan view showing a variation in the arrangement of the tread elements; and Fig. 7 is a perspective view of a modified construction of the tread elements shown in Fig. 6.

Similar characters of reference designate corresponding parts throughout the several views.

The form of construction shown in Fig. 1 consists essentially of the following elements, viz: an outer metallic casing rigidly associated with the rim, a rubber tube wholly inclosed in the casing and of the construction of an ordinary inner tube, and tread elements coöperating with the rubber tube. The outer casing embodies two annular sections 1 and 2, the section 1 being rigidly secured to the wooden rim 3 and the section 2 being rigidly secured to the section 1 by bolted flange connections 4. The sections 1 and 2 in their assembled relation have a hollow rectangular cross section and in the inclosed space which they define the rubber cushioning tube 5 is arranged. The tread elements which coöperate with the cushioning tube are shown at 6 and in their preferred form have an I-shaped cross section. They thus comprise a shank 6ᵃ, an inner head 6ᵇ and an outer head 6ᶜ. The section 2 of the outer metallic casing has a thickened peripheral portion which is preferably of double wall construction and includes, in addition to the outer peripheral wall 7, an inner wall 8 concentrically related to the wall 7 and between which a space 9 occurs, which may be simply an air space, as in Fig. 1, or which may contain a light filler of leather or other suitable material, as shown at 10 in Fig. 3. The walls 7 and 8 are moreover formed with registering slots through which the shanks 6ᵃ of the tread elements extend. The object of forming the section 2 with a thickened peripheral portion is to provide for more efficiently guiding the tread elements in their radial movements. It will be apparent that the walls of the slots through which the shanks 6ª extend constitute guides for said shanks and owing to the thickened construction of the peripheral portion of the outer section 2, the extent of the guiding surfaces is materially increased. For this reason undue lateral play of the tread elements is prevented and it follows that there will be no undue wear nor any liability to distortion of the cross section of the tread elements. Between the heads 6ᵇ and the adjacent portion of the inner tube 5 an annular protecting strip 12, preferably of soft rubber, is interposed. This strip is capable of yielding at any portion of its extent and consequently does not interfere with the individual displacement of a particular tread element. The strip 12 moreover protects the inner tube 5 from wear. In order to obtain an efficient yielding displacement of the tread elements the openings through which the shanks 6ª extend are preferably of outwardly flaring outline, as shown in Fig. 3.

In Fig. 5 the invention is shown in its application to an ordinary tire, the latter being made to constitute the cushioning adjunct. In this construction the outer casing is made in sections 1ª and 2ª corresponding to the sections 1 and 2 employed in the construction of Fig. 1. The section 1ª is, however, fitted over the wooden rim and is beaded or flanged so that its edge portion fits over the metal rim 13 which is attached to said wooden rim in the ordinary manner. The section 2ª is shaped to correspond to the cross section of an ordinary tire; is jointed to the section 1ª by bolted flange connections 4ª and is also beaded or flanged at its edge portion to fit over the metal rim 13. The latter secures the rubber casing 14 which is the outer tube of an ordinary tire and within which the inner tube 15 is arranged. The section 2ª completely incloses the casing 14 and its peripheral portion is preferably of the double wall construction above described, and involves inner and outer walls 7ª and 8ª corresponding to the walls 7 and 8 of the construction of Fig. 1. Owing to the curved cross section of the section 2ª the tread elements present their heads 6ᶜ in transversely convexwise disposition.

In the plan view shown in Fig. 6 the tread elements are arranged at angles to one another in such manner that each pair of adjoining tread elements forms a V. The slots through which the shanks extend are of course shaped and arranged accordingly.

In Fig. 7 a modified construction of tread element is shown in which the shank for each tread element comprises a pair of pins which connect the inner and outer heads.

From the foregoing description it will be apparent that the inflated inner tube construction provides for the same degree of resiliency as that which is secured by an inflated rubber tire; that the tread elements afford an efficient anti-skidding means and are individually yieldable to pass over small obstructions or surface irregularities as shown in Fig. 1; that the protecting strip 12 or, in the construction shown in Fig. 5, the casing 14, affords an efficient means for preventing undue wear on the inner tube and at the same time does not interfere with the individual yielding of the tread elements; that the complete inclosure of the inner tube within an outer metallic shell prevents blow-outs and makes it possible to use a less degree of inflating pressure, since the stresses are taken up by the walls of the outer casing; that in the event of a deflation of the inner tube the practical use of the tire is still possible, enabling the driver to complete his run; that the inflation of the inner tube does not produce any material expansion thereof nor change its cross sectional shape to any material degree, for which reason the inner tube is not so readily liable to become cracked or scored as in the ordinary constructions and consequently will have a longer life; that the thickened construction of the outer peripheral portion of the metallic casing provides against undue lateral play of the tread elements and affords an increased extent of lateral support, thereby preventing undue wear as well as the liability of cross sectional distortion of the tread elements; that the attachment of the outer casing directly to the wooden rim and the complete inclosure of the inner tube within the outer casing provides against any relative creeping or peripheral displacement of the outer casing and the rim or of the outer casing and the inner tube.

Having fully described my invention, I claim:

A cushion tire comprising an outer metallic shell which is made in two sections having bolted flange connection with one another, one of the sections being rigidly secured to the rim of the wheel and the other section having a thickened peripheral portion which is provided with slotted openings, tread elements having an I-shaped cross section and having shanks slidably disposed in the slotted openings and heads at each end of the shanks and of greater extent than the openings, the adjacent end faces of the openings and the shanks being relatively tapering so as to provide for a certain degree of pivotal longitudinal displacement of said shanks as the tread elements come into contact with the ground, an inflatable rubber cushioning tube wholly inclosed in the shell, and a protecting strip of flexible material interposed between the cushioning tube and the tread elements to protect the former, the cushioning tube and the protecting strip together conforming to the cross sectional outline of the shell, the said thickened peripheral portion being of double walled construction and having an intervening space in which packing material may be interposed.

In testimony whereof I have hereunto set my hand in presence of two subscribing witnesses.

ALBIN HAJOS.

Witnesses:
S. C. BROOKS,
CHAS. S. COFFEY.